(12) United States Patent
Kang

(10) Patent No.: US 9,963,375 B1
(45) Date of Patent: May 8, 2018

(54) GLASS HEATING FURNACE

(71) Applicant: TUNG CHANG MACHINERY AND ENGINEERING CO., LTD., Taoyuan (TW)

(72) Inventor: Chung-Hsieh Kang, Taoyuan (TW)

(73) Assignee: TUNG CHANG MACHINERY AND ENGINEERING CO., LTD., Taoyuan (TW)

( * ) Notice: Subject to any disclaimer, the term of this patent is extended or adjusted under 35 U.S.C. 154(b) by 0 days. days.

(21) Appl. No.: 15/296,185

(22) Filed: Oct. 18, 2016

(51) Int. Cl.
*C03B 27/00* (2006.01)
*C03B 25/00* (2006.01)
*C03B 27/012* (2006.01)

(52) U.S. Cl.
CPC ................. *C03B 27/012* (2013.01)

(58) Field of Classification Search
CPC ....... C03B 27/012; C03B 35/16; C03B 35/24; C03B 31/162; C03B 2225/00–2225/02
USPC ................... 65/111, 114, 117, 118, 119, 355
See application file for complete search history.

(56) References Cited

U.S. PATENT DOCUMENTS

| | | | | |
|---|---|---|---|---|
| 3,406,022 A * | 10/1968 | Gehenot | ............... | C03B 27/012 65/104 |
| 3,776,707 A * | 12/1973 | Inoue | .................... | C03B 27/044 65/29.19 |
| 4,370,036 A * | 1/1983 | Kelly | .................... | H01J 9/2272 396/547 |
| 4,913,720 A * | 4/1990 | Gardon | ............... | C03B 27/0413 65/104 |
| 6,064,040 A * | 5/2000 | Muller | .................. | C03B 27/012 219/388 |
| 6,067,820 A * | 5/2000 | Silander | ................ | C03B 27/012 65/114 |
| 8,234,883 B2 * | 8/2012 | Krall, Jr. | .................. | C03B 27/02 65/104 |
| 9,617,181 B2 * | 4/2017 | Vehmas | ................ | C03B 27/012 |

* cited by examiner

*Primary Examiner* — Nahida Sultana
(74) *Attorney, Agent, or Firm* — Jackson IPG PLLC; Demian K. Jackson

(57) ABSTRACT

A glass heating furnace is disclosed, comprising a furnace body, an interior of which is formed with a chamber; plural upper heating elements which are disposed in the chamber; plural lower heating elements, which are disposed in the chamber and are located oppositely below the upper heating elements; plural rollers, which are disposed in the chamber and are locate between the upper heating elements and the lower heating element to carry glass to be heated up; and a roller power module, which is disposed outside the furnace body and is connected with the rollers. The rollers are controlled by the roller power module to rotate clockwise and counterclockwise, driving glass to displace along a transversal direction. In addition, the upper heating elements and the lower heating elements are arranged in the chamber alternatingly and asymmetrically at an upper and lower position.

10 Claims, 5 Drawing Sheets

GLASS HEATING FURNACE

BACKGROUND OF THE INVENTION a) Field of the Invention

The present invention relates to a glass heating furnace, and more particularly to a glass heating furnace in which upper heating elements and lower heating elements are disposed in an alternating arrangement asymmetrically at an upper and lower position, and rollers rotate clockwise and counterclockwise, so that glass can be heated up more uniformly, thereby reducing effectively the thermal stress marks which are formed on the glass.

b) Description of the Prior Art

Glass is equipped with the excellent permeability and is scratch-proofed. Therefore, glass is widely used in a daily life, such as buildings and general articles for daily use. Furthermore, even in electronic products or vehicles, there are related glass products. Accordingly, it is apparently that the glass-related merchandises have already been everywhere in the people's life.

Glass is mostly made by the procedure of dosing, melting, forming and annealing. After making glass, glass can be also processed by an automatic apparatus such as a glass heating furnace. Glass is heated up by the glass heating furnace to improve the strength.

Referring to FIG. 1 and FIG. 2, a conventional glass heating furnace includes a chamber which is provided with plural upper heating elements 1 and lower heating elements 2 aligned symmetrically at an upper and lower position. In addition, plural rollers 3 are disposed between the upper heating elements 1 and the lower heating elements 2 to carry glass A. The glass A stays in the chamber for a fixed time at a fixed position and is heated up by the thermal radiation from the upper heating elements 1 and the lower heating elements 2. After being heated up for the fixed time at the fixed position, the glass A is driven by a roller power module 4 to be transmitted out of the chamber, and is then cooled down rapidly, thereby improving the strength. However, when the glass A receives the thermal radiation, the molecules in the glass will displace microscopically to be realigned and stacked with one another. Hence, if the glass A does not move at that fixed position, a part in the glass A directly below the upper heating elements 1 and directly above the lower heating elements 2 will be irradiated by the upper heating elements 1 and the lower heating elements 2 directly, resulting in a higher temperature at that part. This enables the glass molecules at that part to displace more easily and to be realigned and stacked with one another more tightly. On the other hand, for other area on the glass A which is not irradiated by the upper heating elements 1 and the lower heating elements 2 directly, such as the area that is not directly below the upper heating elements 1 and not directly above the lower heating elements 2, the temperature is lower in comparison with the part that is irradiated by the upper heating elements 1 and the lower heating elements 2 directly. This allows the glass molecules at that area to displace less easily and to be less easily realigned and stacked with one another, so that the molecules will be stacked less tightly comparing to the part that is irradiated by the upper heating elements 1 and the lower heating elements 2 directly. As the molecules are stacked more tightly at that part, the density in that part is higher; whereas, as the molecules are stacked less tightly at that area, the density in that area is lower. Therefore, the thermal stress marks will be formed by the heating due to the difference in density in the abovementioned two portions, and the refractive index will be different due to the difference in density. In addition, when light passes through the glass, the thermal stress marks in the glass can be identified visually due to the angle of refraction, thereby affecting the quality of uniformity for a same piece of glass.

SUMMARY OF THE INVENTION

Accordingly, the primary object of the present invention is to provide a glass heating furnace in which the upper heating elements and the lower heating elements are disposed in the alternating arrangement asymmetrically at the upper and lower position, so that the glass can be heated up more uniformly, thereby reducing effectively the thermal stress marks which are formed on the glass. Another object of the present invention is to provide a glass heating furnace in which the rollers rotate clockwise and counterclockwise, so that the glass can be heated up more uniformly.

According to the objects of the present invention, a glass heating furnace is disclosed, including a furnace body, an interior of which is formed with a chamber; plural upper heating elements which are disposed in the chamber; plural lower heating elements which are disposed in the chamber and are located oppositely below the upper heating elements; plural rollers which are disposed in the chamber and are located between the upper heating elements and the lower heating elements to carry glass to be heated up; and a roller power module which is disposed outside the furnace body and is connected with the rollers, with the roller power module controlling the rollers to rotate clockwise and counterclockwise to drive the glass to displace reciprocatively along a transversal axis. In addition, the upper heating elements and the lower heating elements are disposed in the chamber in an alternating arrangement asymmetrically at an upper and lower position.

In accordance with the abovementioned technical features, the center of one said upper heating element is separated with the center of a neighboring upper heating element by a first distance.

In accordance with the abovementioned technical features, the said lower heating elements are disposed in the chamber are located oppositely below the upper heating element, with the center of one lower heating element being separated with the center of a neighboring lower element by a second distance.

In accordance with the abovementioned technical features, the said rollers are disposed in the chamber along a transversal axis and are located between the upper heating elements and the lower heating elements, with the transversal axis being perpendicular to the axis of the rollers.

In accordance with the abovementioned technical features, the center of each said upper heating element is configured respectively with an upper normal line which is perpendicular to the transversal axis, the center of at least one lower heating element is disposed between two neighboring upper normal lines, and the center of that lower heating element is not overlapped with those two neighboring normal lines. Or, the center of each said lower heating element is configured respectively with a lower normal line which is perpendicular to the transversal axis, the center of at least one upper heating element is disposed between two neighboring lower normal lines, and the center of that upper heating element is not overlapped with those two neighboring lower normal lines.

In accordance with the abovementioned technical features, the said upper heating elements or lower heating elements are perpendicular or parallel to the rollers.

In accordance with the abovementioned technical features, the centers of at least 25% of the lower heating elements are not overlapped with any one upper normal line, or the centers of at least 25% of the upper heating elements are not overlapped with any one lower normal line.

In accordance with the abovementioned technical features, the centers of at least 50% of the lower heating elements are not overlapped with any one upper normal line, or the centers of at least 50% of the upper heating elements are not overlapped with any one lower normal line.

In accordance with the abovementioned technical features, the centers of at least 75% of the lower heating elements are not overlapped with any one upper normal line, or the centers of at least 75% of the upper heating elements are not overlapped with any one lower normal line.

In accordance with the abovementioned technical features, the center of any one lower heating element is not overlapped with any one upper normal line, or the center of any one upper heating element is not overlapped with any one lower normal line.

In accordance with the abovementioned technical features, the center of the lower heating element is separated with one of the two neighboring upper normal lines by one fourth of the first distance, or the center of the upper heating element is separated with one of the two neighboring lower normal lines by one fourth of the second distance.

In accordance with the abovementioned technical features, the center of the lower heating element is separated with one of the two neighboring upper normal lines by one third of the first distance, or the center of the upper heating element is separated with one of the two neighboring lower normal lines by one third of the second distance.

In accordance with the abovementioned technical features, the said threaded block is fixed with the furnace body.

In accordance with the abovementioned technical features, the center of the lower heating element is separated with one of the two neighboring upper normal lines by one half of the first distance, or the center of the upper heating element is separated with one of the two neighboring lower normal lines by one half of the second distance.

In accordance with the abovementioned technical features, it is preferred that the center of one upper heating element is separated with the center of a neighboring upper heating element by 5~13 cm.

In accordance with the abovementioned technical features, it is preferred that the center of one lower heating element is separated with the center of a neighboring lower heating element by 5~13 cm.

In accordance with the abovementioned technical features, it is preferred that the center of one roller is separated with the center of a neighboring roller by 8~20 cm.

In accordance with the abovementioned technical features, it is preferred that the furnace body includes a rack, an interior of the rack is surrounded by a heat insulation layer and a chamber is formed in the heat insulation layer.

In accordance with the abovementioned technical features, it is preferred that each upper heating element and each lower heating element include respectively a ceramic tube and a fixed base. The ceramic tube is connected with the fixed base, and the fixed base is connected with the rack.

In accordance with the abovementioned technical features, it is preferred that the fixed base is connected with and fixed on the rack by screws or welding.

In accordance with the abovementioned technical features, it is preferred that the upper heating elements and the lower heating elements are perpendicular to the rollers.

In accordance with the abovementioned technical features, it is preferred that the roller power module includes a motor, plural transmission wheels and plural round belts. The motor is connected with one transmission wheel, the transmission wheels are connected with one another by the round belts, and at least one transmission wheel is connected with the rollers.

In accordance with the abovementioned technical features, it is preferred that the roller is made of glass, ceramic or quartz.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

In order to facilitate the examiner to understand the technical features, the contents and the advantages of the present invention, as well as the efficacy that can be reached by the present invention, the present invention will now be described in detail with the drawings and the form of expression of the embodiment. The drawings used are only for illustration and support of the specification, and hence are not necessarily accurate in scale and precise in configuration after implementation of the present invention. Therefore, it should not be interpreted based upon the scale and the configuration on the drawings to confine the scope of the rights claimed on the practical implementation of the present invention.

Figure 1:
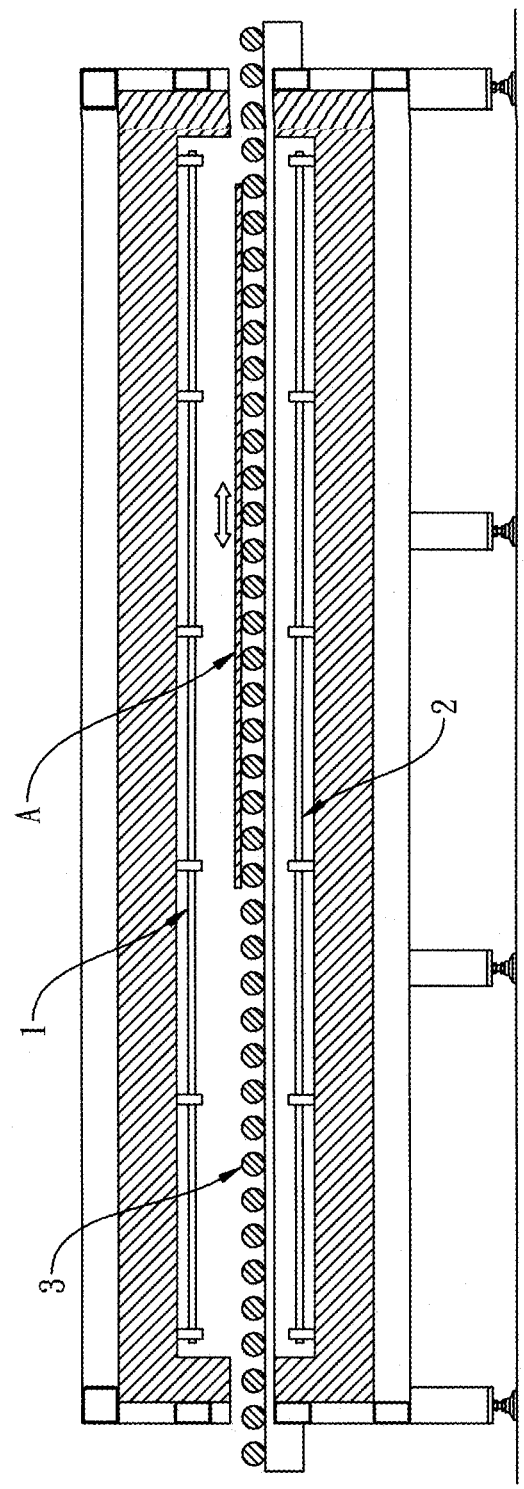
FIG. 1 shows a first schematic view of a conventional glass heating furnace.
Figure 2:
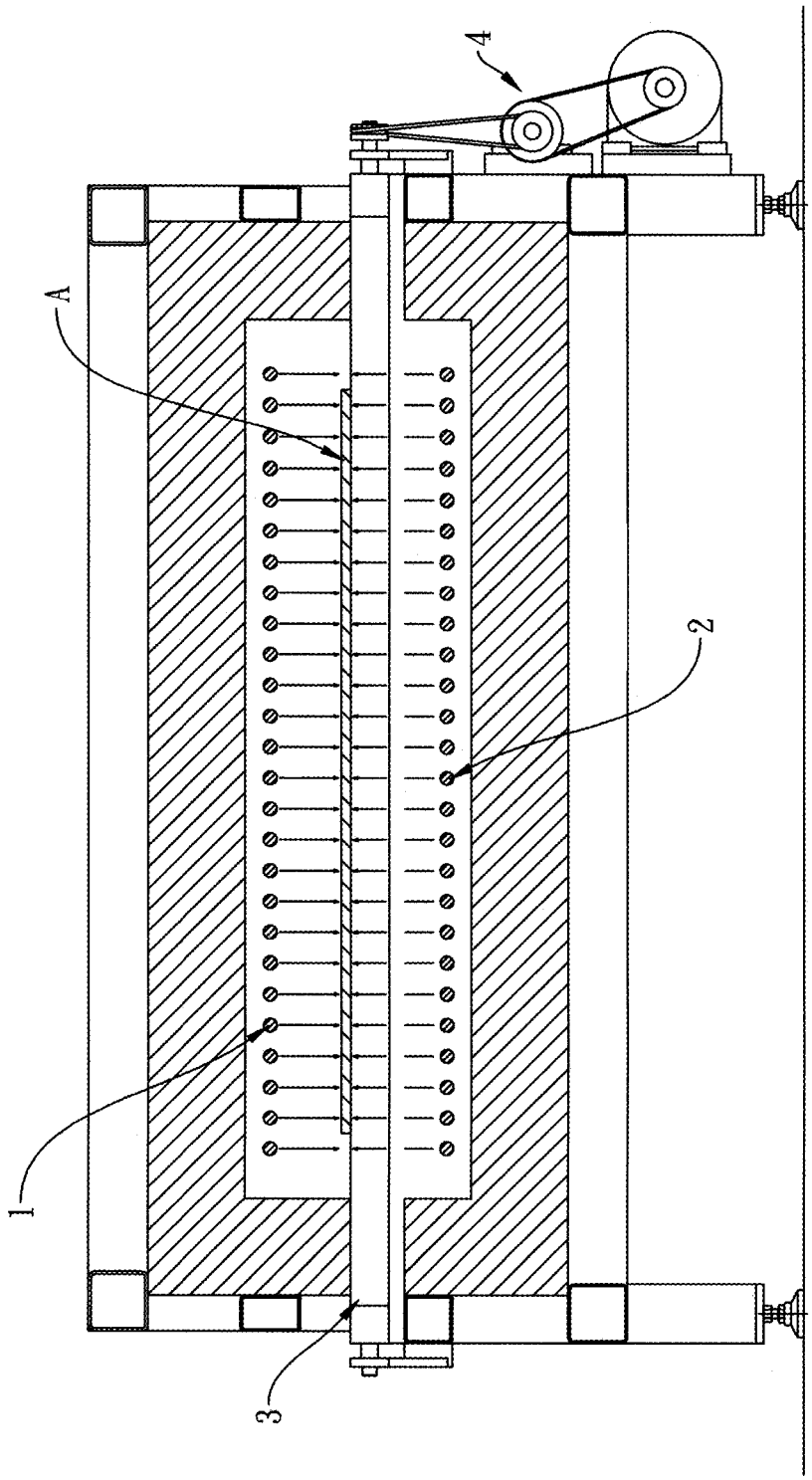
FIG. 2 shows a second schematic view of the conventional glass heating furnace.
Figure 3:
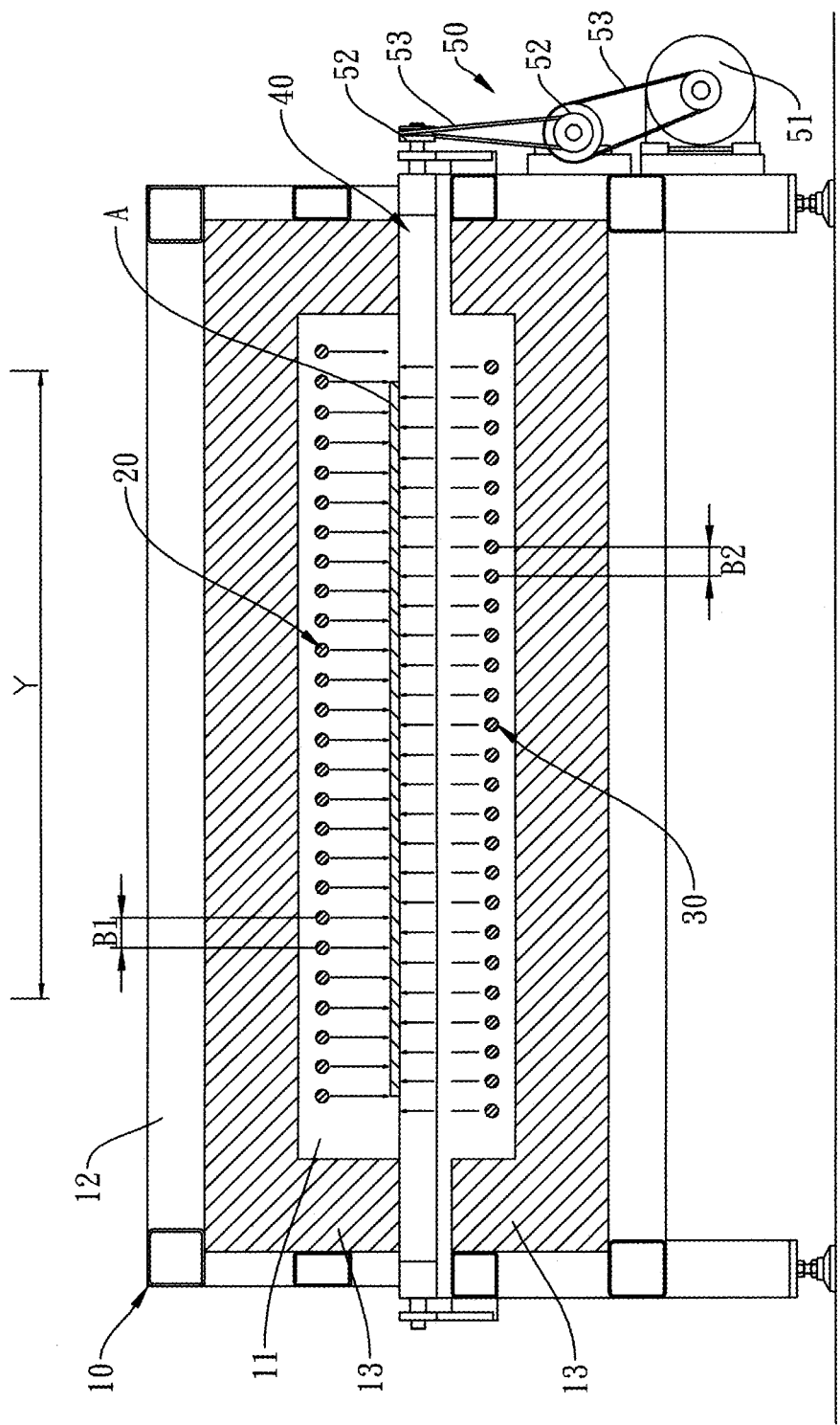
FIG. 3 shows a first schematic view of an embodiment of the glass heating furnace, according to the present invention.
Figure 4:
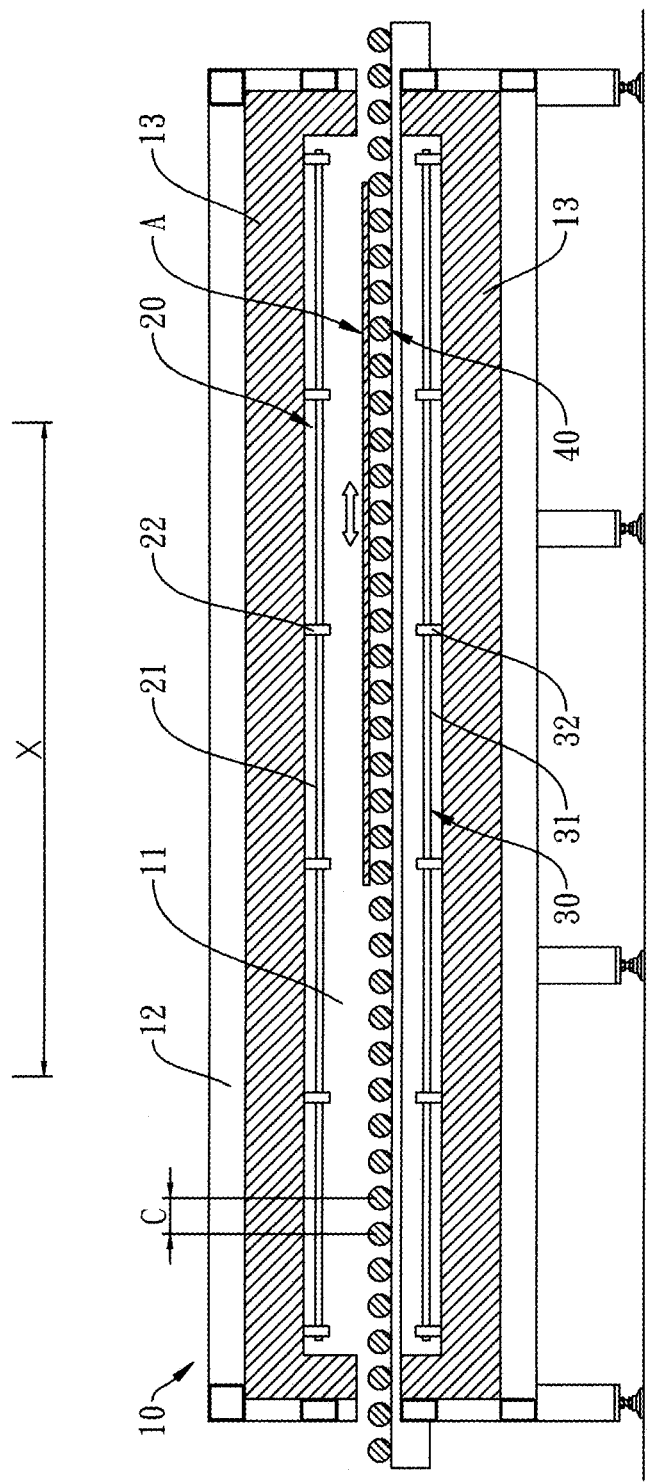
FIG. 4 shows a second schematic view of the embodiment of the glass heating furnace, according to the present invention.
Figure 5:
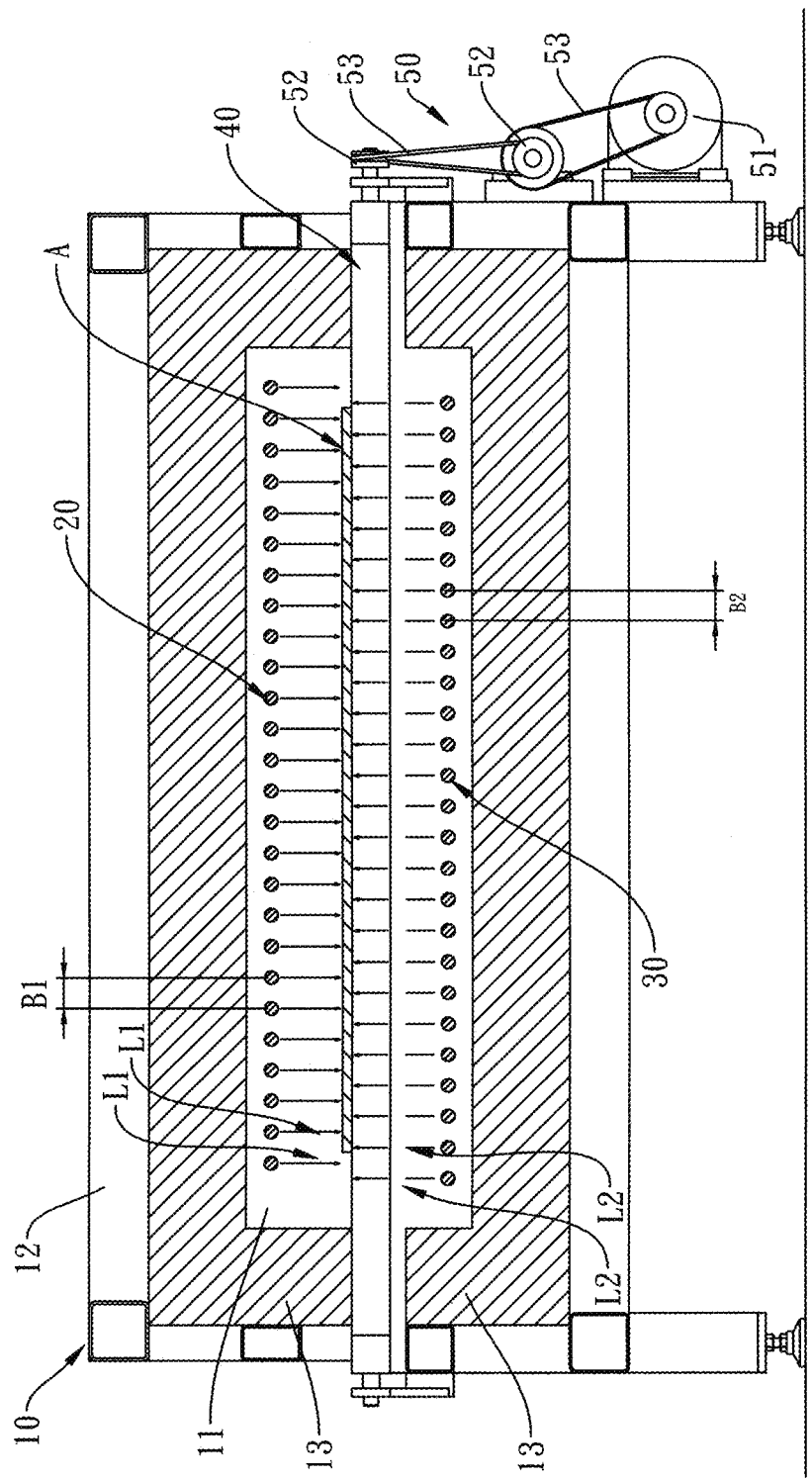
FIG. 5 shows a third schematic view of the embodiment of the glass heating furnace, according to the present invention.

Referring to FIGS. 3 to 5, it shows respectively a first schematic view, a second schematic view and a third schematic view, according to an embodiment of a glass heating furnace of the present invention. The glass heating furnace disclosed by the present invention employs primarily plural alternatingly arranged heating elements to improve the uniformity of heating to glass, thereby reducing the formation of thermal stress marks on the glass. The glass heating furnace comprises at least a furnace body 10, plural upper heating elements 20, plural lower heating elements 30, plural rollers 40, and a roller power module 50.

The furnace body 10 includes a rack 12, an interior of the rack 12 is surrounded by a heat insulation layer 13, and a chamber 11 is formed in the heat insulation layer 13. The plural upper heating elements 20 are disposed in the chamber 11, and each upper heating element 20 includes at least a ceramic tube 21 and a fixed base 22. The ceramic tube 21 is connected with the fixed base 22, and the fixed base 22 is connected with and fixed on the rack 12 by screws or welding. Preferably, the upper heating elements 20 are disposed in intervals, and the center of one upper heating element 20 is separated with the center of a neighboring upper heating element 20 by a first distance B1 of 5~13 cm. The lower heating elements 30 are disposed in the chamber 11 and are located oppositely below the upper heating elements 20. Each lower heating element 30 includes at least another ceramic tube 31 and another fixed base 32. The ceramic tube 31 is connected with the fixed base 32, and the fixed base 32 is connected with and fixed on the rack 12 by screws or welding. Preferably, the lower heating elements 30 are disposed in intervals, and the center of one lower heating element 30 is separated with the center of a neighboring lower heating element 30 by a second distance B2 of 5~13 cm.

The rollers 40 are disposed in intervals in the chamber 11 along a transversal axis X and are located between the upper heating elements 20 and the lower heating elements 30. The transversal axis X is perpendicular to the axis Y of the rollers 40, and the center of one roller 40 is separated with the center of a neighboring roller 40 by a preferred third distance C of 8~20 cm. The rollers 40 can be used to carry glass A to be heated up and are controlled to rotate clockwise and counterclockwise, driving the glass A to displace reciprocatively along the transversal axis X. Each roller 40 can be designed as a barrel and can be made of glass, ceramic or quartz, for example. The upper heating elements 20 or the lower heating elements 30 can be perpendicular or parallel to the rollers 40, and in the present embodiment, the upper heating elements 20 or the lower heating elements 30 are perpendicular to the rollers 40.

The center of each upper heating element 20 is configured with an upper normal line L1 which is perpendicular to the transversal axis X, the center of at least one lower heating element 30 is disposed between two neighboring upper normal lines L1, and the center of that lower heating element 30 is not overlapped with those two neighboring upper normal lines L1, forming the alternating arrangement to the upper heating elements 20 and the lower heating elements 30. It is preferred that the centers of at least 25% of the lower heating elements 30 are not overlapped with any one upper normal line L1. It is better that the centers of at least 50% of the lower heating elements 30 are not overlapped with any one upper normal line L1. It is even better that the centers of at least 75% of the lower heating elements 30 are not overlapped with any one upper normal line L1. And, it is the best that the center of any one lower heating element 30 is not overlapped with any one upper normal line L1.

Preferably, the center of the lower heating element 30 is disposed between the two neighboring upper normal lines L1, and is separated with one of the two neighboring upper normal lines L1 by one fourth of the first distance B1. It is better that the center of the lower heating element 30 is disposed between the two neighboring upper normal lines L1, and is separated with one of the two neighboring upper normal lines L1 by one third of the first distance B1. And, it is the best that the center of the lower heating element 30 is disposed between the two neighboring upper normal lines L1, and is separated with one of the two neighboring upper normal lines L1 by one half of the first distance B1.

Or, the center of each lower heating element 30 is configured with a lower normal line L2 which is perpendicular to the transversal axis X, the center of at least one upper heating element 20 is disposed between two neighboring lower normal lines L2, and the center of that upper heating element 20 is not overlapped with those two neighboring lower normal lines L2, forming the alternating arrangement to the upper heating elements 20 and the lower heating elements 30. It is preferred that the centers of at least 25% of the upper heating elements 20 are not overlapped with any one lower normal line L2. It is better that the centers of at least 50% of the upper heating elements 20 are not overlapped with any one lower normal line L2. It is even better that the centers of at least 75% of the upper heating elements 20 are not overlapped with any one lower normal line L2. And, it is the best that the center of any one upper heating element 20 is not overlapped with any one lower normal line L2.

Preferably, the center of the upper heating element 20 is disposed between the two neighboring lower normal lines L2 and is separated with one of the two neighboring lower normal lines L2 by one fourth of the second distance B2. It is better that the center of the upper heating element 20 is disposed between the two neighboring lower normal lines L2 and is separated with one of the two neighboring lower normal lines L2 by one third of the second distance B2. And, it is the best that the center of the upper heating element 20 is disposed between the two neighboring lower normal lines L2 and is separated with one of the two neighboring lower normal lines L2 by one half of the second distance B2.

The roller power module 50 is disposed outside the furnace body 10 and is connected with the rollers 40. The rollers 40 can rotate clockwise and counterclockwise under the control of the roller power module 50, driving the glass A to displace reciprocatively along one direction. In the present embodiment, the glass A is driven to displace reciprocatively along the X-axis. More specifically, the roller power module 50 includes a motor 51, plural transmission wheels 52 and plural round belts 53. The motor 51 is connected with one transmission wheel 52, and the transmission wheels 52 are connected with one another by the round belts 53; whereas, at least one transmission wheel 52 is connected with the rollers 40. The motor 51 drives one transmission wheel 52 to rotate, and that transmission wheel 52 drives other transmission wheels 52 to rotate through the round belts 53, thereby allowing the transmission wheel 52 that is connected with the rollers 40 to drive the rollers 40 to displace reciprocatively along the X-axis, as shown in FIG. 5.

Accordingly, in the glass heating furnace of the present invention, the rollers 40 rotate clockwise and counterclockwise to control the glass A to displace reciprocatively along the transversal direction. In addition, the upper heating elements 20 and the lower heating elements 30 are arranged alternatingly and asymmetrically at the upper and lower position, which enables the glass A to be heated up more uniformly upon receiving the thermal radiation, thereby reducing effectively the formation of the thermal stress marks on the glass A to lower the possibility that the quality of the glass A is affected.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A glass heating furnace comprising:
   a furnace body, an interior of which is formed with a chamber;
   a plurality of upper heating elements, which are disposed in the chamber, with the center of one upper heating element being separated with the center of a neighboring upper heating element by a first distance;
   a plurality of lower heating elements, which are disposed in the chamber and are located oppositely below the plurality of the upper heating elements, with the center of one lower heating element being separated with the center of a neighboring lower heating element by a second distance; and a plurality of rollers, which are disposed in the chamber along a transversal axis and are located between the plurality of upper heating elements and the plurality of lower heating elements, with the transversal axis being perpendicular to the axis of the plurality of rollers;

wherein the center of each upper heating element is configured with an upper normal line which is perpendicular to the transversal axis, the center of at least one lower heating element is disposed between two neighboring upper normal lines, and the center of that lower heating element is not overlapped with those two neighboring upper normal lines; or the center of each lower heating element is configured with a lower normal line which is perpendicular to the transversal axis, the center of one upper heating element is disposed between the two neighboring lower normal lines, and the center of that upper heating element is not overlapped with those two neighboring lower normal lines.

2. The glass heating furnace according to claim 1, wherein the upper heating elements or the lower heating elements are perpendicular or parallel to the plurality of rollers.

3. The glass heating furnace according to claim 1, wherein the centers of at least 25% of the plurality of lower heating elements are not overlapped with any one upper normal line, or the centers of at least 25% of the plurality of upper heating elements are not overlapped with any one lower normal line.

4. The glass heating furnace according to claim 1, wherein the centers of at least 50% of the plurality of lower heating elements are not overlapped with any one upper normal line, or the centers of at least 50% of the plurality of upper heating elements are not overlapped with any one lower normal line.

5. The glass heating furnace according to claim 1, wherein the centers of at least 75% of the plurality of lower heating elements are not overlapped with any one upper normal line, or the centers of at least 75% of the plurality of upper heating elements are not overlapped with any one lower normal line.

6. The glass heating furnace according to claim 1, wherein the center of any one lower heating element is not overlapped with any one upper normal line, or the center of any one upper heating element is not overlapped with any one lower normal line.

7. The glass heating furnace according to claim 1, wherein the center of one of the lower heating elements is separated with one of the two neighboring upper normal lines by one fourth of the first distance, or the center of one of the upper heating elements is separated with one of the two neighboring lower normal lines by one fourth of the second distance.

8. The glass heating furnace according to claim 1, wherein the center of one of the lower heating elements is separated with one of the two neighboring upper normal lines by one third of the first distance, or the center of one of the upper heating elements is separated with one of the two neighboring lower normal lines by one third of the second distance.

9. The glass heating furnace according to claim 1, wherein the center of one of the lower heating elements is separated with one of the two neighboring upper normal lines by one half of the first distance, or the center of one of the upper heating elements is separated with one of the two neighboring lower normal lines by one half of the second distance.

10. The glass heating furnace according to claim 1, further comprising a roller power module which is disposed outside the furnace body and is connected with the plurality of rollers, with the plurality of rollers being controlled by the roller power module to rotate clockwise and counterclockwise.

* * * * *